J. W. LEDOUX.
FLUID METER.
APPLICATION FILED NOV. 16, 1910.
1,064,748.
Patented June 17, 1913.
2 SHEETS—SHEET 1.
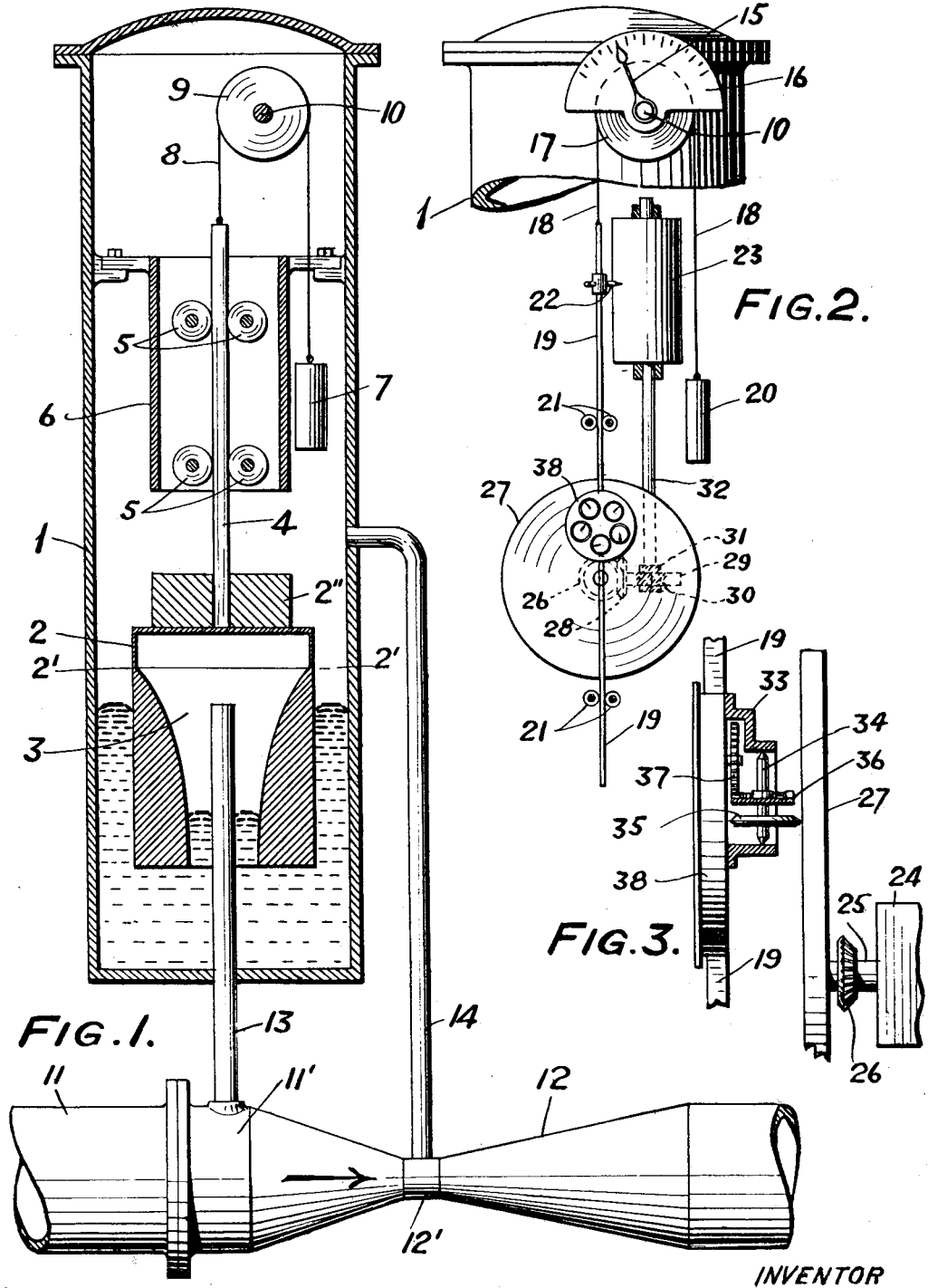
WITNESSES:
INVENTOR
John W. Ledoux
BY
Charles N. Butler
ATTORNEY.

J. W. LEDOUX.
FLUID METER.
APPLICATION FILED NOV. 16, 1910.

1,064,748.

Patented June 17, 1913.
2 SHEETS—SHEET 2.

WITNESSES:

INVENTOR
John W. Ledoux
BY
Charles N. Butler
ATTORNEY.

UNITED STATES PATENT OFFICE.

JOHN W. LEDOUX, OF SWARTHMORE, PENNSYLVANIA.

FLUID-METER.

1,064,748.     Specification of Letters Patent.     Patented June 17, 1913.

Application filed November 16, 1910. Serial No. 592,609.

*To all whom it may concern:*

Be it known that I, JOHN W. LEDOUX, a citizen of the United States, residing at Swarthmore, in the county of Delaware and State of Pennsylvania, have invented certain Improvements in Fluid-Meters, of which the following is a specification.

My invention is a fluid meter comprising a chamber adapted to contain a fluid heavier than that to be measured, a float containing a chamber adapted to be sealed by said fluid, and means for communicating differential pressures of the fluid to be measured to the surfaces of said heavier fluid in said chambers.

The float is designed so that its displacement of the heavier fluid shall vary with the velocity of the fluid to be measured and so that its movement shall bear a simple ratio to changes in the velocity of flow, whereby the velocity or volume of fluid flowing at any instant can be indicated upon a uniformly graduated scale.

It is a leading object of my invention to produce a meter of simple construction that shall have a high degree of accuracy throughout the range of its action and particularly a meter that will measure at low velocities at which meters used and proposed are inaccurate.

The characteristics of my improvements will more fully appear by reference to the following description and the accompanying drawings in illustration thereof, in which:—

Figure 4:
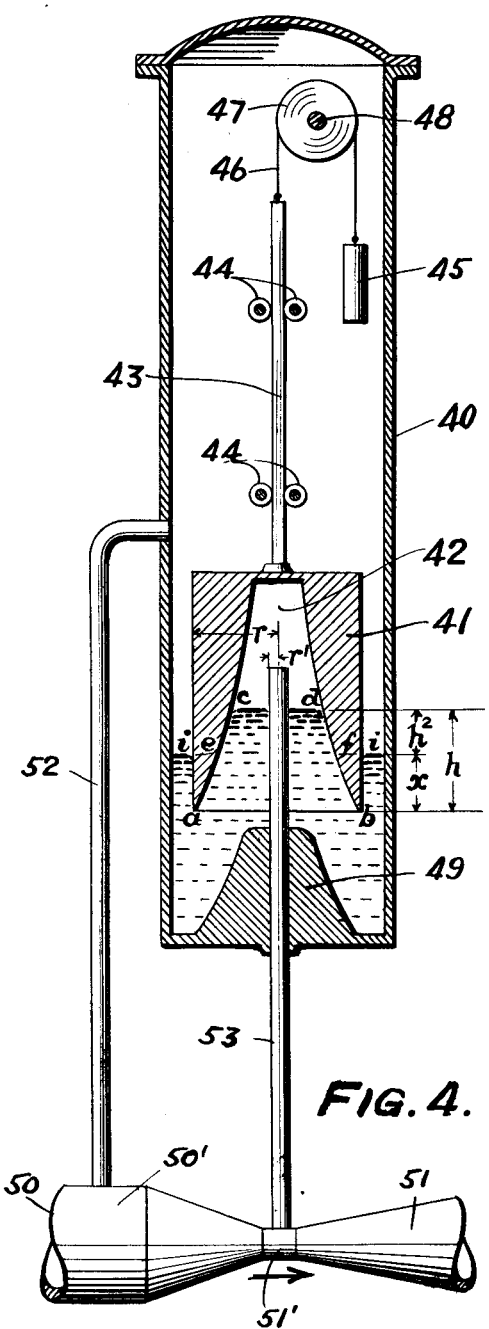
Figure 5:
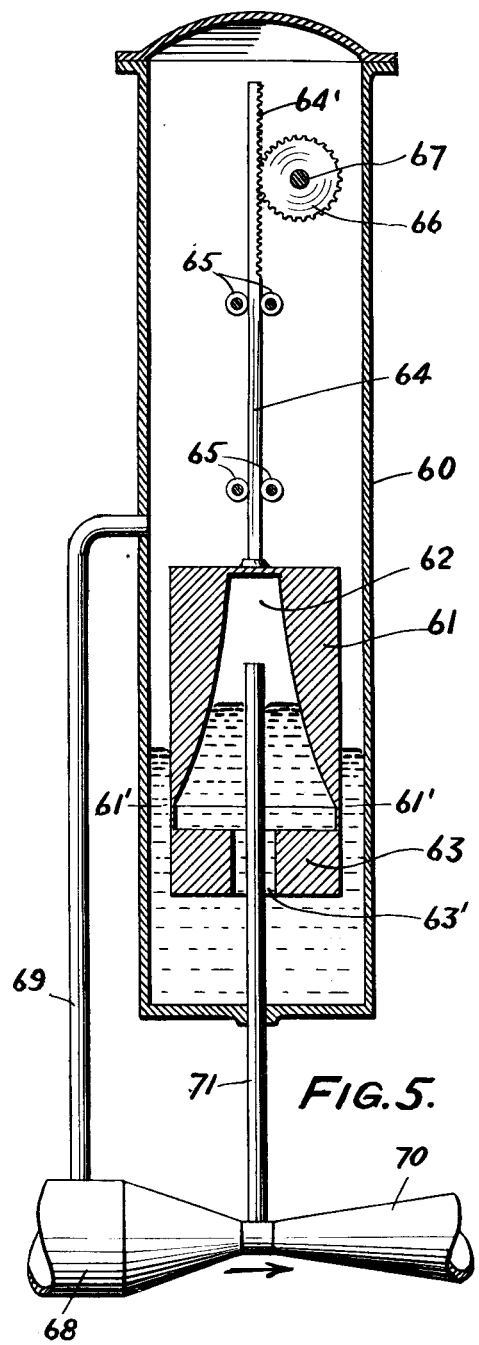

Figure 1 is a sectional elevation of a meter embodying my invention; Fig. 2 is an exterior view of the top of the construction shown in Fig. 1 with mechanism applied thereto for indicating the operations; Fig. 3 is a part sectional side elevation illustrating features of the indicating mechanism; and Figs. 4 and 5 are sectional elevations respectively representing modifications in construction.

Referring to Fig. 1, a closed casing 1 provides a chamber containing a hollow float 2 whose inner portion 3 is sealed by a fluid, as mercury, contained in the casing. The float here shown is a figure of revolution having a cylindrical exterior surface and an interior surface expanding as it approaches the line 2'—2' at its top, where it approximately reaches the outer surface, so that the cross sectional area of the float increases from substantially nothing as the distance from this line increases, within the desired limits of the float's movements.

In order to effect the submergence of the float, it is composed of material of suitable specific gravity and may be weighted by a load 2''.

A guide rod 4, fixed to the float, passes between the rollers 5, which are journaled within a stationary cage 6 supported by the casing 1. A counter-weight 7 is connected with the guide rod by a flexible tension member 8 which passes over the sheave 9. The sheave is fixed on a shaft 10 journaled in the top of the casing and revolved by the engagement of the member 8 with the sheave 9, the counter-weight 7 acting to keep the tension member taut and revolve the sheave.

A conduit 11, provided with a Venturi section 12, has its normal section 11' connected by a pipe 13 with the interior of the float chamber above the height to which the mercury rises, and the throat 12' of the Venturi section is connected by a pipe 14 with the interior of the casing 1 at a point above the mercury.

The shaft 10 has fixed thereon, exterior to the casing, a pointer 15, which is movable over a stationary uniformly graduated dial 16 to indicate the position of the float and the rate of flow.

A sheave 17 is fixed to the shaft 10, exterior to the casing, and a tension member 18 passes over this sheave, the tension member supporting the oppositely acting rod 19 and poise 20. The rod, which is guided by rollers 21, carries a marker 22 adapted to act upon a recorder cylinder 23, the marker being moved parallel to the axis of the cylinder proportionately to changes in the flow.

A clock 24 has fixed on its constantly revolving arbor 25 a bevel gear 26 and a disk 27. The gear 26 engages a bevel gear 28 fixed on a journal shaft 29, having a worm 30 thereon which engages a worm wheel 31 on the journal shaft 32, the latter revolving the cylinder 23. The rod 19 has fixed thereto a cage 33 in which is journaled an arbor 34 disposed parallel to the rod. The arbor is revolved by a traction wheel 35 fixed thereon and engaging the surface of the driving disk 27, the wheel being movable between the center and periphery of the disk by the movement of the rod 19 due to the action of the float 2. A crown gear 36 is fixed on the arbor 34 and engages the gear wheel 37 of a register 38, the rate of the register varying with the changes of the position of the traction wheel with relation to the center of the disk.

When the fluid, as water, in the conduit 11 is quiescent, the pressures communicated through the ducts 13 and 14 will be equal, the float will stand at its position of greatest submergence with the line 2'—2' coincident with the surfaces of the mercury within and without the float, the pointer 15 will indicate no flow on the dial, the marker 22 will stand at the datum line on the recording cylinder 22, and the wheel 35 will make contact with the center of the disk 27, the register being idle. As the flow rises from zero to the maximum, the pressure communicated through the duct 13 gradually rises above the pressure communicated through the duct 14, and the resultant or differential pressure effects the rise of the float with a corresponding fall of the mercury within the float as it fills the space vacated by the rising float.

The float is so shaped that its vertical movement will be proportional to the changes in velocity in the conduit 12. As the float rises, the hand 15, the marker 22 and the wheel 35 are moved proportionately, the pointer indicating on the dial the rate at any given instant, the marker making a record on the cylinder showing the rate of flow curve, and the register integrating the flow.

In Fig. 4 there is shown a casing 40 providing a closed chamber containing a hollow float 41. This float is a figure of revolution having a cylindrical exterior surface and an interior surface 42 contracting from the bottom of the float, the cross sectional area increasing from zero at the bottom toward the top.

A rod 43, fixed to this float, is controlled by guide rollers 44 and is connected with a counterpoise 45 by a flexible tension member 46 which passes over the sheave 47, fixed on the journaled shaft 48.

Mercury contained in the casing constantly seals the interior of the float, the amount of mercury required being reduced by the use of a stationary displacing device 49 adapted to be received within the hollow portion of the float.

A conduit 50, provided with a Venturi section 51, has its normal section 50' connected by a pipe 52 with the interior of the casing above the mercury therein, and the Venturi section has its throat 51' connected by a pipe 53 with the interior of the float above the mercury therein.

When water in the conduit 50 is quiescent, the pressures communicated through the ducts 52 and 53 are equal and the float 41 will stand at its highest position with its lower edge touching the surface of the mercury. As the flow through the conduit increases toward the maximum, the pressure communicated through the duct 52 rises above that communicated through the duct 53 and the float moves downward a distance proportionate to the increase in flow, the float being so proportioned that its movement as controlled by the mercury shall be in constant ratio to changes in the velocity of flow.

As shown in Fig. 5, a casing 60 provides a closed chamber containing a hollow float 61 having an interior surface 62. This float, similar in construction to that shown in Fig. 4, has a displacing device 63 fixed to its lower edge and constantly immersed in the mercury contained in the casing. A rod 64, fixed to the float, is guided by rollers 65 and is provided with a rack 64' which engages a pinion 66 fixed on a shaft 67 journaled in the casing. A conduit 68 has its normal section connected by the pipe 69 with the interior of the casing 60, above the mercury, and the throat of its Venturi section 70 connected by the pipe 71 with the interior of the float, above the mercury, the pipe 71 passing through the aperture 63' in the displacing device.

It will be understood that, as in Fig. 4, the float stands at its highest elevation when the liquid in the conduit is quiescent, its plane indicated by the line 61' being then coincident with the surface of the mercury, the function of the device 63 being to provide a constant balance for the float. As the flow in the conduit rises from zero to the maximum, the float gradually descends, and the rack acts upon the gear wheel 66 to revolve the shaft 67 proportionately to changes in the velocity of flow.

The mathematical character of the type of meter represented in Fig. 4 will appear from the following demonstration.

Assuming that the float 41 (having its lower line $a$—$b$ coincident with the surface of the mercury when the pressures in the pipes 52 and 53 are equal) is immersed to the depth $x$ due to the condition of flow and the difference in the pressures communicated through the pipes, the displaced mercury $iea, fib$ exerts an upwardly acting force equal to the differential or resultant force which has carried the float down, which is equal to the weight of the volume of mercury $cdef$; as these volumes are equal, and the surface of the mercury exterior to the float constantly remains stationary, let $V$=volume $iea, fib$; $V_1$=volume $cdef$ minus the part thereof displaced by the pipe 53. As $V=V_1$ and as the mercury level $i\ i$ will not change, the vertical heights $ia$ and $ib$ will represent the vertical descent of the float from a given datum. Let $x$=descent of float; $h$=depth of mercury in float; $h_2$= height of mercury level in float above that outside; $H_2$ = difference in water pressures communicated through the pipes 52 and 53.

If the specific gravities of water and mercury are 1 and 13.6 respectively, then this relation may be represented by the equation $$h_2 = \frac{H_2}{12.6}$$

Now the velocity of flow through the conduit 50 is proportional to the square root of $H_2$ and therefore proportional to $h_2$.

Let us assume that the float is so shaped on the inside that $x$ will be proportional to the square root of $h_2$ and, in fact, equal thereto, hence the equation $$x^2 = h_2$$

and $$h = h_2 + x,$$

and, substituting the value $h_2$ in this equation, $$h = x^2 + x,$$

or $$x = \sqrt{h + \frac{1}{4}} - \frac{1}{2}$$

Let $y$ = variable radius of inner surface of float; $r$ = radius of outer cylindrical surface; $r_1$ = radius of pipe 53's outer surface. Then $$\pi r^2 x - \pi r_1^2 x + V - V = \int_{h=0}^{h=x+x^2} \pi(y^2 - r_1^2) dh$$

Differentiating the last equation to remove the integral, there results $$\pi r^2 dx - \pi r_1^2 dx = \pi(dx + 2x dx)(y^2 - r_1^2)$$

(Note: $dh = dx + 2x dx = (1+2x)dx$.)
Then dividing by $dx$ and $\pi$ $$r^2 - r_1^2 = (1+2x)(y^2 - r_1^2)$$

or $$y^2 = r_1^2 + \frac{r^2 - r_1^2}{1+2x}$$

and as $$h = x + h_2 = x + x^2,$$

then $$x = \pm\sqrt{h + \frac{1}{4}} - \frac{1}{2}$$

For $h=0$, $x=0$, and the plus sign of the radical is required.

Therefore $$y^2 = r_1^2 + \frac{r^2 - r_1^2}{2\sqrt{h + \frac{1}{4}}}$$

From this equation the curve can be plotted readily by assigning suitable values to the constants $r$ and $r_1$. Taking $h$ as abscissa and $y$ as ordinates, for $h=0$, $y=r$: for $h=\alpha$, $y=r_1$: therefore for all positive values of $h$ between the limits of zero and $+\alpha$, $y$ has finite rational values, which proves the device to be theoretically practical under all working conditions.

It is evident that the same demonstrations could apply whether the conduit is a Venturi tube, a pipe with Pitot tubes or any other form of orifice the velocity of flow through which is proportional to the square root of the head causing such velocity, and with a simple modification it will also apply to a weir, the resulting formula for the float shown in Fig. 4 being $$y^2 = r_1^2 + \frac{r^2 - r_1^2}{1 + \frac{2}{3 \times \frac{1}{3}}}$$

All of these relations depend upon the proposition that the volume displaced by the hollow float is equal to the volume of the heavier liquid within the float above the surface of such heavier liquid without the float. This volume is expressed by the equation $V = ah_2$, in which $h_2$ is the height of the liquid within the float above the level of such liquid without the float; $a$ is the average cross section of the liquid within the float, and $V$ is the displacement of the heavier liquid by the float.

As $h_2 = cx^2$, by substitution, $V = acx^2$, upon which the other formulæ depend: the constant $c$ being the factor of calibration and representing the ratio of the rise of the float to the square root of the difference in level of the heavier liquid within and without the float, which may be taken as unity.

Having described my invention, I claim:

1. In a fluid meter, a conduit for carrying a liquid to be measured, a casing containing a liquid heavier than that to be measured, a displacing device of variable cross section movable in said casing and containing a chamber of variable cross section sealed by said heavier liquid, and means for communicating differential pressures from the liquid in said conduit to the surface of the heavier liquid in said casing within and without said chamber.

2. In a fluid meter, a conduit for carrying a liquid to be measured, a casing containing a liquid heavier than that to be measured, a displacing device movable in said casing and containing a chamber sealed by said heavier liquid, and means for communicating differential pressures from the liquid in said conduit to the surface of said heavier liquid within and without said chamber, said displacing device and chamber having variable cross sections whereby the movement of said displacing device is in a simple ratio to changes in the flow of the liquid in said conduit.

3. In a fluid meter, a conduit for carrying a liquid to be measured, a casing containing a liquid heavier than that to be measured, a displacing device movable in said casing and containing a chamber sealed by said heavier liquid, and means for communicating differential pressures from the liquid in said conduit to the surface of said heavier liquid within and without said chamber, said displacing device increasing upwardly in cross sectional area and said chamber decreasing upwardly in cross sectional area so that the movement of said displacing device shall be in constant ratio to changes in the flow of said liquid in said conduit.

4. In a fluid meter, a conduit for carrying a liquid to be measured, a casing containing a liquid heavier than that to be measured, a displacing device movable in said casing and containing a chamber sealed by said heavier liquid, and means for communicating differential pressures from said liquid in said conduit to the surface of said heavier liquid within and without said chamber, said displacing device having straight exterior elements and a variable cross sectional area whereby its movement is regulated to a simple ratio with relation to changes in flow of said liquid in said conduit.

5. In a fluid meter, a conduit for carrying a liquid to be measured, a casing containing a liquid heavier than that to be measured, a displacing device of variable cross section movable in said casing and containing a chamber of variable cross section sealed by said heavier liquid, said device having straight exterior elements, a counterbalancing displacing device of constant cross-section in said heavier liquid, and means for communicating differential pressures from said liquid in said conduit to the surface of said heavier liquid within and without said chamber.

In witness whereof I have hereunto set my name this 14th day of November, A. D. 1910, in the presence of the subscribing witnesses.

JOHN W. LEDOUX.

Witnesses:
  Jos. G. Denny, Jr.,
  C. N. Butler.

Corrections in Letters Patent No. 1,064,748.

It is hereby certified that in Letters Patent No. 1,064,748, granted June 17, 1913, upon the application of John W. Ledoux, of Swarthmore, Pennsylvania, for an improvement in "Fluid-Meters," errors appear requiring correction as follows: In the drawings, sheet 2, Fig. 4, for the reference-letter "$h^1$" read $h_2$; page 8 of the printed specification, line 80, formula, for $$y^2 = r_1^2 + \frac{r^2 - r_1^2}{1 + \frac{2}{3 \times t}} \text{ read } y^2 = r_1^2 + \frac{r^2 - r_1^2}{1 + \frac{2}{3x^4}}$$

and that said Letters Patent should be read with these corrections therein that the same may conform to the record of the case in the Patent Office.

Signed and sealed this 14th day of October, A. D., 1913.

[SEAL.]

R. T. FRAZIER,
*Acting Commissioner of Patents.*